United States Patent
Endebrock et al.

[15] 3,687,546
[45] Aug. 29, 1972

[54] PHOTO-PRINTING APPARATUS

[72] Inventors: Edward N. Endebrock, San Jose; Charles M. Bodine, Los Altos, both of Calif.

[73] Assignee: IPT Corporation, Mountain View, Calif.

[22] Filed: Aug. 13, 1970

[21] Appl. No.: 63,494

[52] U.S. Cl. ................................................355/73
[51] Int. Cl. .............................................G03b 27/60
[58] Field of Search..................................355/73, 76

[56] References Cited

UNITED STATES PATENTS 3,357,335  12/1967  Blatherwick............355/73 X

*Primary Examiner*—Samuel S. Matthews
*Assistant Examiner*—Monroe H. Hayes
*Attorney*—Limbach, Limbach & Sutton

[57] ABSTRACT

Photo-printing apparatus for duplicating a master photo-mask or plate. A copy is placed on a holder within a door pivotally mounted to a housing enclosing a light exposure system. The master plate is placed upon the housing and automatically aligned with the copy plate when the copy plate is pivoted into an operational position. The copy plate is held in place by negative pressure applied through a piston located in the door. Positive pressure is exerted upon the piston and master plate during exposure, while still maintaining the negative pressure behind the copy plate. After exposure, the positive pressure is removed and, in a preferred embodiment, a negative pressure is provided to the back of the master plate to facilitate separation of the master and copy plates.

17 Claims, 11 Drawing Figures

INVENTORS
CHARLES M. BODINE
EDWARD N. ENDEBROCK

ATTORNEYS

FIG. 3
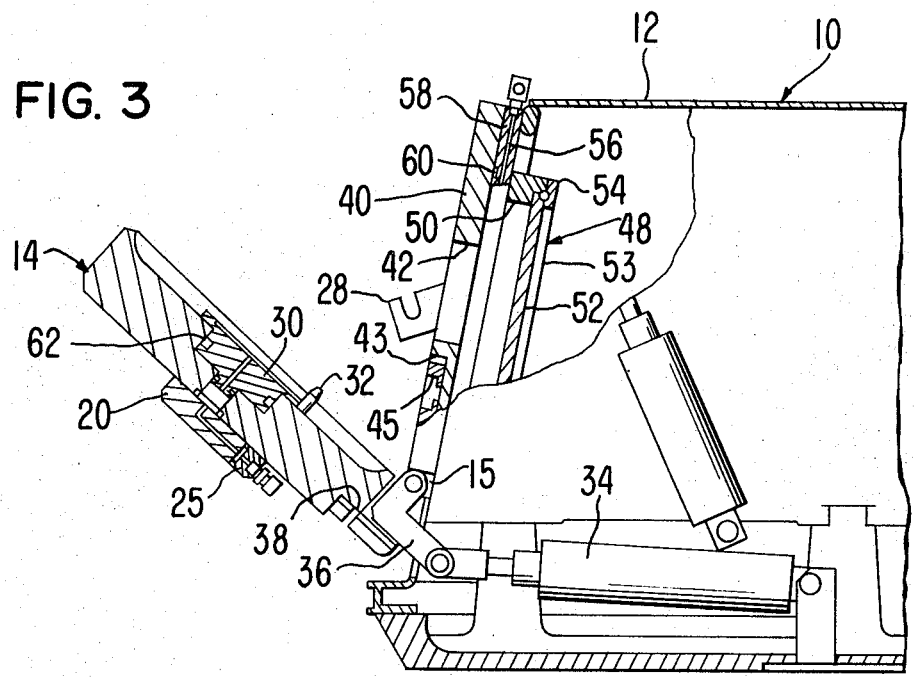
FIG. 4A
FIG. 4B
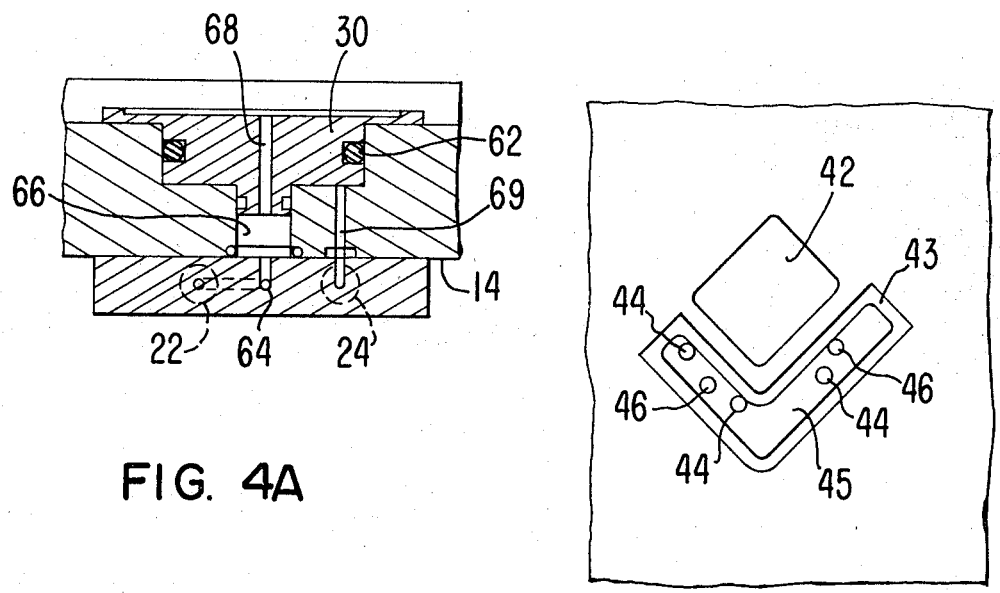
INVENTORS
CHARLES M. BODINE
EDWARD N. ENDEBROCK
BY *Limbach, Limbach and Sutter*
ATTORNEYS

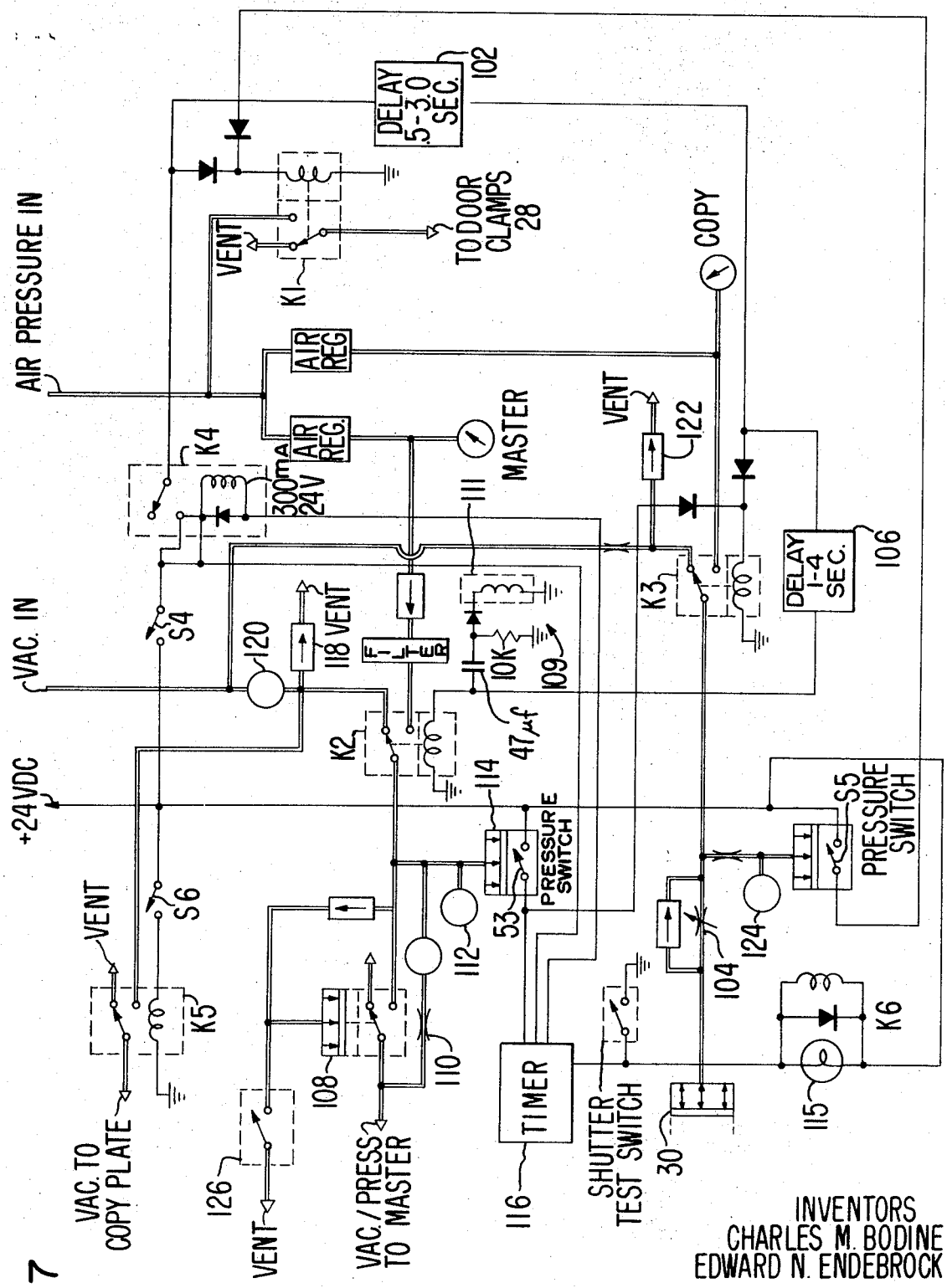

PHOTO-PRINTING APPARATUS

BACKGROUND OF THE INVENTION

The present invention relates to photo-printing apparatus, and more particularly to photo-printing apparatus useful in photo-chemical manufacturing processes to duplicate photo-masks.

In industries such as the transistor and integrated circuit industries, a required manufacturing step involves exposing high resolution emulsion plates, typically of a photo-resist material, to light. A photo-mask or master plate containing a pattern of opaque and transparent regions is placed in contact with the photo-resist coated plate. The assembly is then exposed to light.

In the case of photo-resist material, exposure to light causes polymerization of the photo-resist layer which makes the areas which have been exposed to the light insoluable in a developing solution. In a subsequent process step, a developer is used to remove the unexposed photo-resist, and further processing is carried on.

In the above described process, it is first necessary to construct the photo-mask. A photo-mask is constructed by well-known, generally laborious techniques. Once a mask has been made, it is generally desirable to duplicate the mask since an original mask represents a sizable investment in time and expense.

Photo-printing equipment used today to duplicate the masks include what are commonly referred to as vacuum frames. A vacuum frame includes a transparent glass exposure plate and a cover plate which may either be transparent or opaque. To make a duplicate, a copy plate and master plate are placed upon the exposure plate and then sandwiched between the exposure and cover plates by manually lowering the cover plate in contact with the master/copy plate assembly. Gaskets along the edges of the frame permit a vacuum to be drawn between the exposure and cover plates to thereby force the master and copy plates into close contact. The master/copy plate assembly is then ready for exposure. After the exposure, the exposure and cover plates must be manually separated and the exposed copy plate removed.

Since the aforesaid apparatus requires a significant amount of manual operation, the processing time typically is excessive, and the processing is subject to human error due, for example, to poor alignment of the master and copy plates. Further the apparatus is simply not well suited for assembly line manufacturing techniques.

BRIEF DESCRIPTION OF THE INVENTION

According to the present invention a master plate to be duplicated and a copy plate are aligned to a handling chamber, and pressed closely together. The copy plate is exposed through the master with a slightly diffused light whose wavelength is designed to achieve a high resolution exposure. Exposure is automatically stopped by a pre-set timer and the chamber opens so that the copy plate may be manually removed. The handling chamber has been designed to provide optimum pressure and yet minimize damage to the master mask plate and the copy plate during handling.

More particularly, with the power on, a master photo-mask or plate is positioned on the master plate holder in the handling chamber. The operator places the copy plate in position on a free-floating piston on a pivoted door. As the operator begins raising the door to close it, a switch is actuated which causes negative pressure, i.e., a vacuum, to be applied to the back surface of the copy plate, thus holding it in position. When the door reaches the almost-closed position, another switch operates which causes two clamps to take hold of the door and pull it to a fully closed position.

As the door approaches the closed position, pins in the door engage the edge of a master plate holder cam member. The pins move the master plate holder cam which causes the master plate to be aligned with the copy plate. When the door is fully closed and clamped, air pressure is applied to the back surface of the piston which supports the copy plate, without releasing the vacuum that holds the copy plate against the piston, pressing it firmly against the master plate. The pressure is applied behind the piston through a different channel from that which is used to maintain the vacuum holding the copy plate. At the same time, positive air pressure is applied to the back surface of the master plate pressing it forward toward the copy plate. The balance of forces prevents excessive curvature or bowing of the combination of the two plates and yet pressing them close together so that good edge definition can be achieved during exposure.

When the two plates are pressed firmly together and are stationary, the shutter within the optical system opens and allows the exposure to begin. Exposure is controlled by a digital timer mounted on the front panel of the machine. The exposure can be pre-set over a range of exposure times, as for example, from 0.1 to 99.9 seconds.

At a signal from the timer, the shutter closes and the door opening sequence begins. Air pressure behind the master plate is removed and replaced by a vacuum that holds the master plate in position on the master plate holder. At the same time, pressure on the back surface of the piston in the door is removed and the piston draws back into the door recess carrying the copy plate with it and separating it from the master plate.

When the plates have been separated, the clamp arms are released and the door swings open ready for manual removal of the exposed copy plate and replacement with a fresh plate. Thus, the only manual operation required in the afore-described sequence is the installation and removal of copy plate and the closing of the door.

The present invention is designed to allow installation of several different sizes of handling chambers. Each handling chamber is built for use with a particular size of glass plate. Changes from one size of glass plate to another can be accomplished easily by changing the handling chambers. Handling chambers are available for glass plate sizes from 2 by 2 inches up to 4 by 5 inches with thickness ranging from 0.060 inch up to 0.250 inch.

The minimizes system is enclosed in a substantially light-tight enclosure which minizes accumulation of dust and interference with the light pattern by extraneous reflections from other parts of the machine. The light source may, for example, be a 70 watt incandescent bulb which is focused through a light diffusion plate by a condenser lens system. The size and position of the diffuser are chosen so as to achieve a proper balance between point source light and diffused light.

Light from an excessively collimated small source can result in projection of microscopic bits of dust within the light system onto the copy plate. Excessively diffused light can result in loss of edge accuracy in the copy plate.

A heat-absorbing (infra-red) glass and a color filter are used to filter out unwanted wave lengths of light from the bulb. A series of first surface mirrors are used to fold the beam within a relatively small area, thereby enabling a significant reduction in the overall size of the machine. Baffles are used to eliminate unwanted reflections from various points within the system.

Control of the photo-apparatus is basically electronic with pneumatic operation of the mechanical functions. Sequencing of events is partially established by microswitches, and partially by electronic delay circuits incorporating microcircuit devices. The electronic controls operate the pneumatic system through solenoid valves. Air pressure and vacuum levels are controlled by pressure regulators mounted in the back panel of the machine.

As described above, the handling chamber consists of the master plate holder and a door containing a free-floating piston which supports the copy plate. The door is hinged to the bottom of the master plate holder. A flexible joint at the hinged edge of the door allows flexing of the door as the clamp arms pull it to the fully closed position. This flexing prevents excessive pressure from being applied to one corner or another of the glass plate surface when the door is fully closed. Additional flexing is provided by motion of the piston in the cavity of the door.

DESCRIPTION OF THE DRAWINGS

FIG. 3 is a cross-sectional view of the photo-apparatus of FIG. 2.

FIG. 4A is a cross-sectional detailed view of a portion of the handling chamber shown in FIG. 3 and taken along the arrows as indicated; FIG. 4B is an enlarged frontal view of the cam holder of FIG. 3.

FIG. 7 is a schematic diagram of the pneumatic/electrical system of the photo-apparatus of the present invention.

DESCRIPTION OF THE PREFERRED EMBODIMENTS

Figure 1:
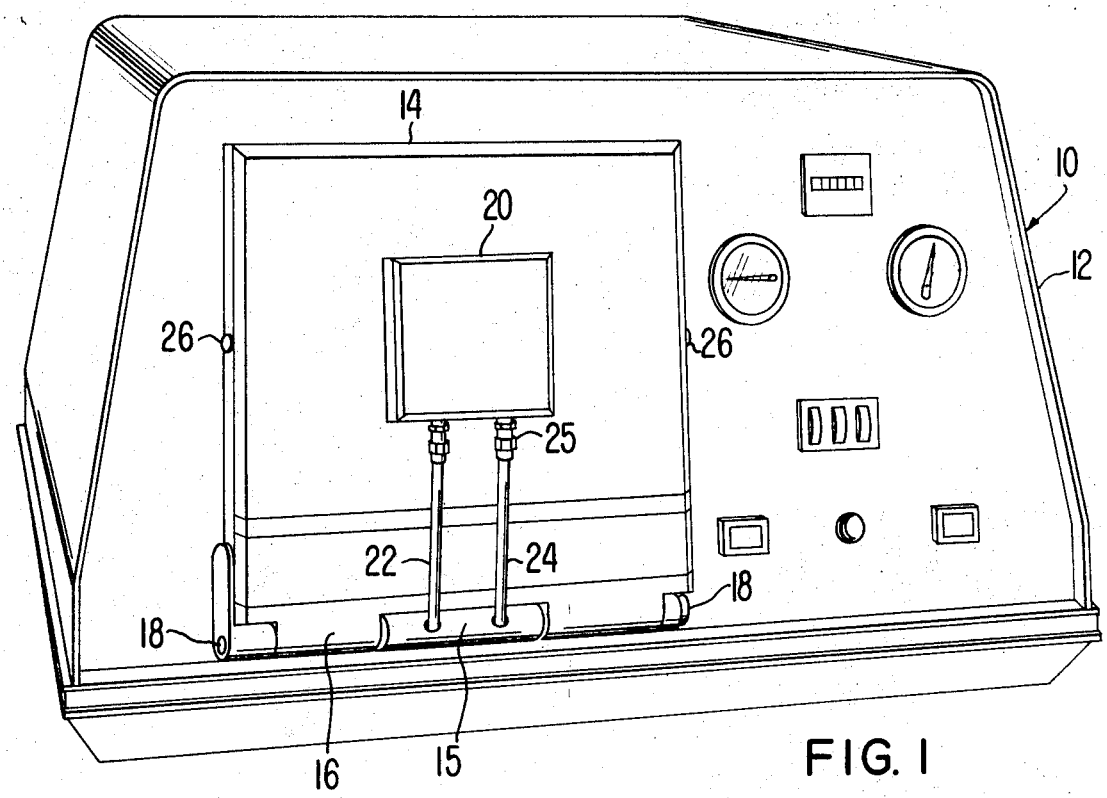
FIG. 1 is a perspective view of the photo-apparatus incorporating the present invention and shown in the operating position.

Photo-apparatus 10 shown in FIG. 1 includes a housing 12. Within the housing 12 are included the electrical, pneumatic and optical systems for the photo-apparatus 10. Mounted to the housing 12 is a copy handling chamber door 14 which is pivotally hinged to a door pivot member 15. The door 14 is mounted to the pivot member 15 by a hinge yoke 16 and by two spring loaded locking pins 18.

Figure 2:
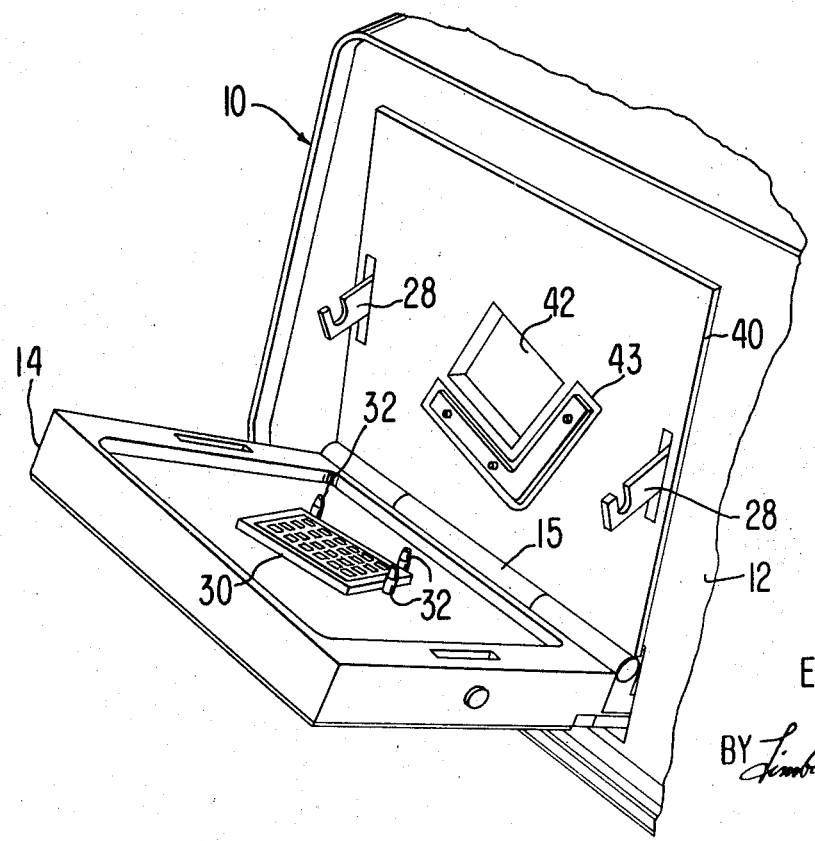
FIG. 2 is a perspective view of the photo-apparatus incorporating the present invention shown in the load or open position.

Mounted to the handling chamber door 14 is a vacuum/pressure block 20 which receives a vacuum line 22 and a pressure line 24. Vacuum pressure lines 22 and 24 are attached to the vacuum/pressure block by means of a connection block 25. The purpose and functioning of the vacuum and pressure lines will be described in detail with reference to FIGS. 2, 3, and 4. Attached along the two sides of the handling chamber door 14 are shoulder screws 26 which cooperate with respective door clamps 28 (FIGS. 2 and 3) to secure the door 14 during the exposure period.

Referring to FIGS. 2, 3, and 4A and 4B, the handling chamber door 14 includes a copy plate holder or piston 30 upon which the copy plate (not shown) is placed. The copy plate is positioned by 3 register pins 32 which automatically align the copy plate in the proper position. The door 14 is pivoted about the door pivot 15 by a pneumatic door opener actuator 34 (FIG. 3) which is pivotally attached to the door 14 by means of a mounting bar 36 which in turn is connected with door 14 by a leaf spring 38. As explained above the leaf spring 38 allows flexing of the door which insures even pressure on the master-copy plate assembly.

A master plate holder 40 is attached to the housing 12. Holder 40 has an aperture 42 through which the exposure beam projects. Referring particularly to a FIG. 4B, a slot 43 within the master plate holder 40 houses a slide cam member 45. Three register pins 44 are secured to the slide 45 for supporting a master plate (not shown). Pins 44 project no further from the surface of master plate holder 40 than the thickness of the thinnest master plate. Slide member 45 is secured within the slot 43 by screws 46 which allow movement of the slide cam 45.

When the door 14 is pivoted into the closed or operating position the register pins 32 of the door 14 engage the slide cam member 45 to slide the cam member, and hence the master plate, into alignment with the copy plate.

Desirably, piston 30 is "free-floating" and is thereby free to pivot somewhat from its normal position, e.g., from its position in a plane perpendicular to its axis of movement. Because of this "play," the piston automatically self-compensates for any lack of parallelism between the master and copy plates.

Mounted within the housing 12 and directly behind the aperture 42 is a pressure window assembly 48. The pressure window assembly 48 includes a window housing 50 which encloses a disc-shaped pressure window glass member 52. The assembly is secured by a retaining ring 53 and pressure integrity maintained by an O-ring 54. Located behind the pressure window assembly is the optical system which will be described in more detail with reference to FIG. 5.

As pointed out above, when the master plate is placed in front of the aperture 42 upon the alignment and register pins 44, and the handling chamber door is closed, pressure is applied to the back side of the master plate through the aperture 42. This pressure is applied through a duct 56 which extends from outside of the housing assembly 12 into an area behind the aperture 42. Note also that the duct 56 is used for providing a negative pressure or vacuum behind the aperture 42 after the exposure has taken place and when the door 14 is opened. This facilitates in the removal of the copy from the master which tend to "stick" to one another. The duct 56 is provided through a front plate or pressure window 58. A air tight seal is maintained between the front plate 58 and the master plate holder 40 by use of an O-ring 60.

Details of the piston 30 which receives the copy plate is shown in FIG. 4A. Piston 30 is free-floating and pressure integrity is maintained by use of an O-ring 62 which is received in a grooved portion of the outer circumference of the piston 30. As pointed out above, the copy plate is held to the surface of the piston 30 by means of a negative pressure or vacuum applied to the surface of the piston 30. The vacuum is drawn from the vacuum line 22 through a vacuum duct 64 which enters into a vacuum chamber 66. The vacuum is conveyed to the surface of the piston 30 through an axially extending passageway or duct 68.

As pointed out above, during he exposure operation, the copy is maintained against the master plate by applying pressure to the piston 30 while simultaneously applying a pressure to the master plate. Pressure to piston 30 is accomplished by providing from the line 24 a pressure duct 69 which extends to the back side of the piston 30. After the exposure, the pressure is relieved through the pressure duct 69. Note however that the vacuum is simultaneously maintained on the surface of the piston 30 during the time that the positive pressure is applied to the duct 69 against the back surface of the piston 30.

OPTICAL SYSTEM

Figure 5:
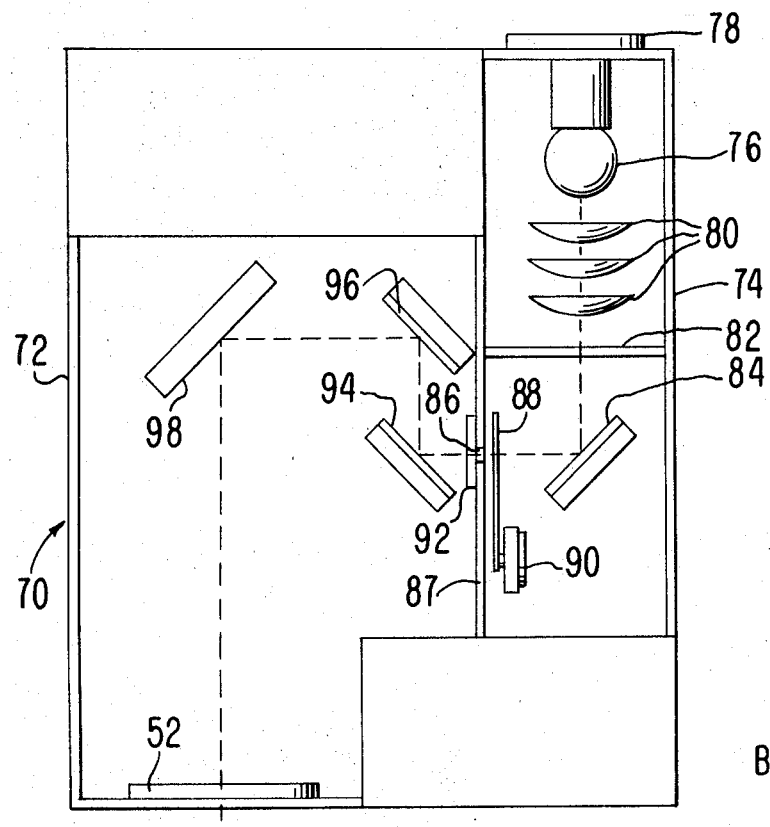
FIG. 5 is a plan view of the optical and exposure systems of the present invention.

The optical system 70 shown in FIG. 5 is housed within a light box 72 made of an aluminum casting and within a condenser chamber 74 mounted on the right rear of the casting. Desirably, a light source 76 includes a 70-watt, 7-ampere spherical incandescent lamp. Its color temperature is normally 2500°K. The lamp 76 is mounted horizontally for easy access within its base in a swivel mount 78 on the rear panel of the condenser chamber 74. The swivel mount 78 allows the bulb position to be adjusted so that the filament is centered on the optical path. Since the light path is horizontal rather than vertical, the blackening that normally occurs at the top of the lamp during the aging process is bypassed, thereby minimizing light losses due to aging.

Light from the lamp 76 is collected by a series of three condenser lenses 80 which focus the beam and transmit it through a heat (infra red) filter 82 onto a first surface or bending mirror 84. The mirror 84 bends the beam sending it through a 5/16-inch diffusion aperture 86 located in wall 87. Passage of light through the diffuser 86 is controlled by a shutter blade 88 operated by a rotary solenoid 90. A color filter 92 behind the diffuser 86 prevents transmittal of undesirable wavelengths of light to the photographic glass plates. The ideal wavelengths that achieve optimal exposure with minimum diffusion within the emulsion of the high-resolution glass plates are between 460 and 560 microns.

Light passed by the filter is bent by three more surface mirrors 94, 96 and 98 respectively and is finally transmitted to the pressure window 52.

PNEUMATIC/ELECTRICAL SYSTEM

Figure 6:
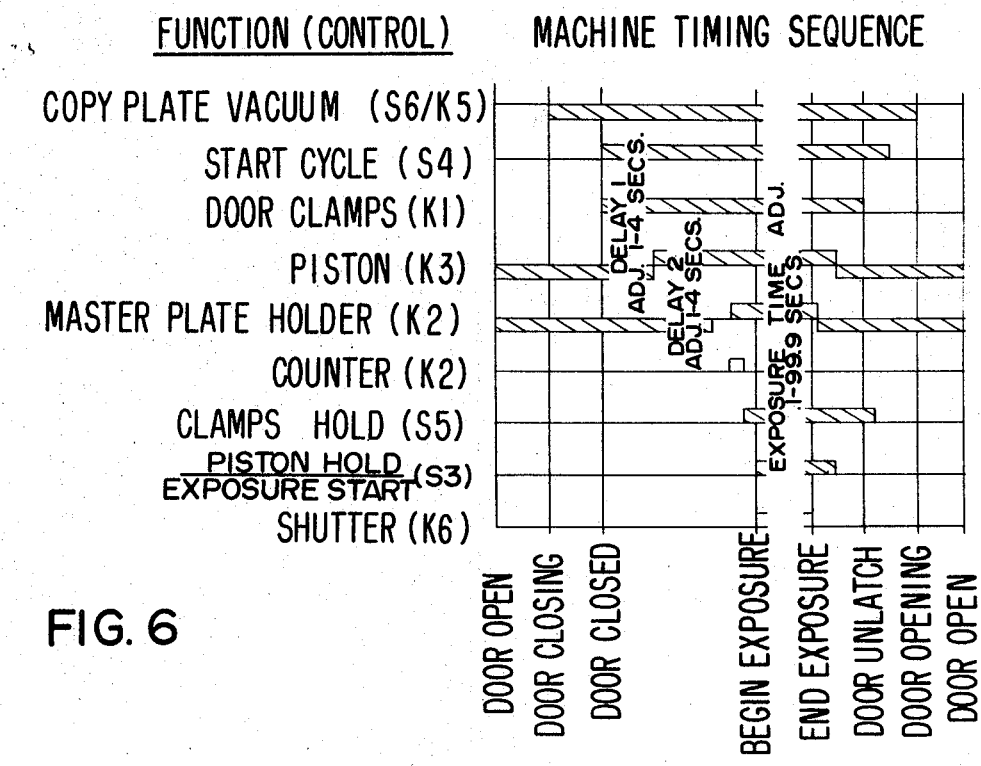
FIG. 6 is an operational chart of the photo-apparatus timing sequence.
Figure 8:
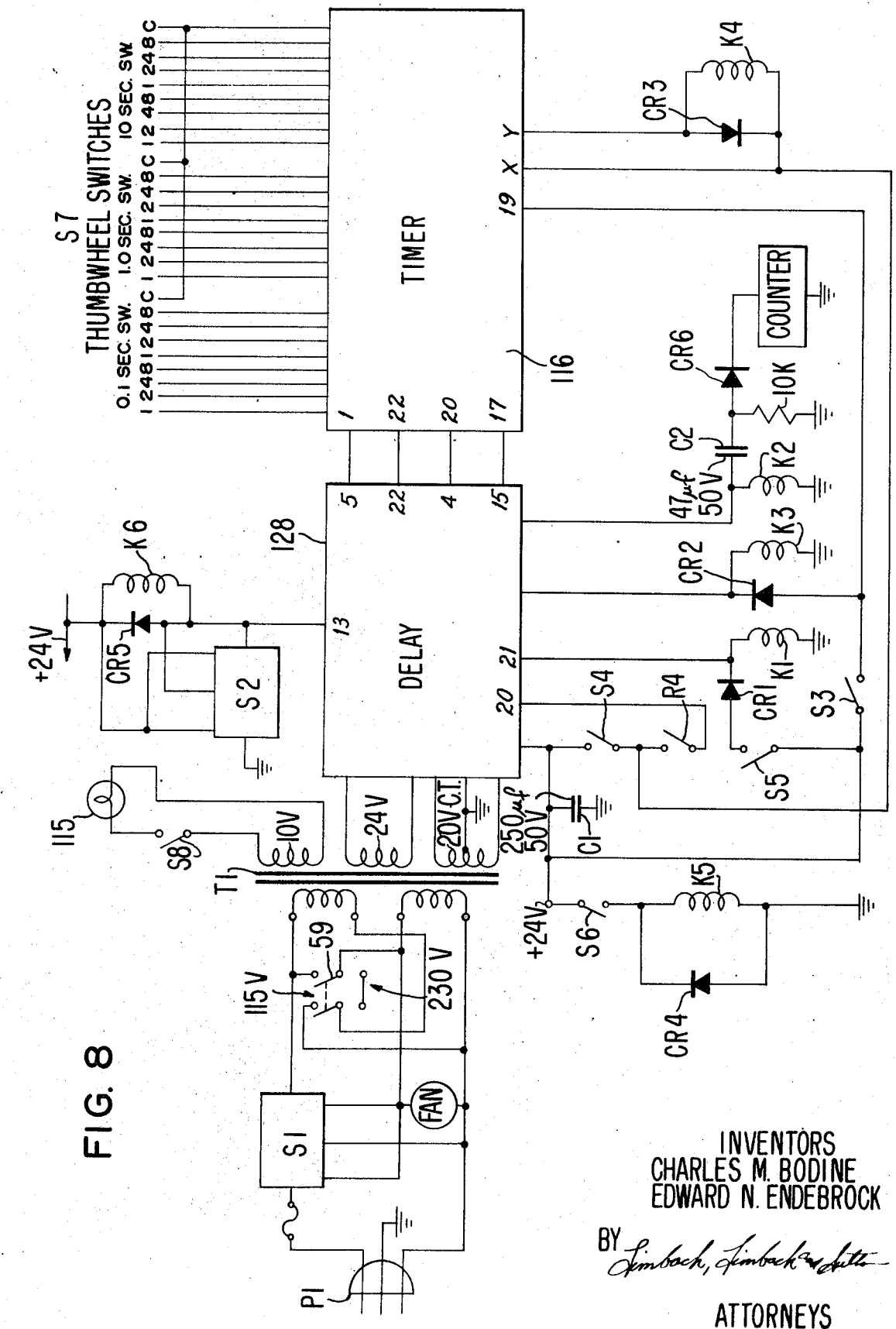
FIG. 8 is a schematic diagram of the electrical system of the present invention.

Referring to FIGS. 6, 7 and 8, when the handling chamber door 14 (FIG. 3) is raised to within 10° of vertical, the camming action of the left door clamp 28 causes switch S6 to switch on, putting +24 volts to relay K5. Actuation of K5 causes vacuum to be applied to the copy plate, holding it in place against piston 30 of the door 14.

When the handling chamber door 14 is within one-sixteenth inch of being closed, the camming action of the right door clamp 28 causes switch S4 to switch on and relay K4 contacts to close, putting +24 volts on relay K1 and triggering the start cycle. Actuation of relay K1 applies pressure to both door clamp cylinders 100 (FIG. 3), causing the clamps 28 to pull the door to the fully closed position. The contacts of relay K4 automatically open after a predetermined time interval.

After an electronic delay 102, relay K3 actuates, transferring from vacuum to pressure. This pressure is applied behind the piston 30, moving it forward so that the copy plate is pressed firmly against the master plate. A flow control valve 104 controls the speed of the piston 30.

After an additional electronic delay 106, relay K2 transfers from vacuum to pressure, causing the air actuator attached to the master plate holder to close the master valve 108. Because the master valve 108 must be actuated before it can apply vacuum or pressure to the master plate, there is no vacuum behind the master plate until after the first exposure when K2 opens.

Actuation of relay K2 also causes a pulse to be transmitted through a counter circuit 109 which includes a counter 111 mounted to the instrument panel. Each time an exposure is made the counter 111 is advanced by one, until reset.

As pressure builds up behind the master plate, small amounts of air bleed through the orifice 110 into the accumulator 112 that is in series with a pressure switch S3. Restriction of flow through the orifice 110 causes pressure to build up behind the master plate first. When this pressure stablizes, the S3 air actuator 114 closes S3 which sends a signal to the timer 116 to start the exposure. The timer does this by energizing shutter 88 relay K6. An indicator light 115 located on the control panel is also energized during the exposure.

When the timer 116 terminates the exposure and opens relay K4, relay K2 also opens. Pressure trapped in the chamber behind the master plate is vented through a check valve 118 before it can reach the vacuum regulator 120. The pressure in the accumulator 112 that is in series with shutter S3 bleeds off slowly through the orifice 110 of the restrictor; this allows sufficient time for vacuum to be established behind the master plate before S3 opens and the piston 30 retracts.

When pressure in the accumulator 112 decreases sufficiently, switch S3 opens, causing relay K3 to open also. Pressure in piston 30 cylinder is vented through a check valve 122. While vacuum is being established, the accumulator 124 in series with pressure switch S5 bleeds off slowly, allowing the piston 30 to return to its home position before S5 opens. When pressure in the accumulator 124 decreases sufficiently, S5 opens, causing K1 to open and trigger the door clamps 28 to release. As the door 14 falls to its open position switch S6 opens causing K5 to open and vent the vacuum behind the copy plate. The copy plate can then be removed from the piston 30 of the door 14.

Although the door 14 is fully open and the machine cycle terminated, pressure still holds the master valve 108 closed, which allows a vacuum to be applied behind the master plate continuously. This vacuum can only be released by the master release valve 126 which is activated by pressing the master release switch on the front panel.

In summary, the timing sequence of the photo apparatus is as follows:
1. S6 switches, putting +24V to K5.
2. K5 actuates, applying vacuum to the copy plate.
3. S4 switches, triggering start cycle.
4. K1 actuates, pulling in door clamps 28.
5. K3 actuates after delay moving piston 30 out to bring the copy plate into contact with master plate.
6. K2 actuates after delay, applying pressure to the master plate. Counter actuates.
7. S5 switches after delay, putting +24V hold voltage to K1.
8. S3 switches after delay putting +24V hold voltage to K3, and putting +24V to timer 116 to start exposure.
9. K6 actuates, opening shutter 88 for pre-set time.
10. K6 releases, closing shutter 88.
11. K2 releases, removing pressure and applying vacuum to the master plate.
12. S3 switches after delay, removing +24V from K3.
13. K3 releases, moving piston 30 and copy plate away from master plate.
14. S5 switches after delay, removing +24V from K1.
15. K1 releases, releasing door clamps 28, allowing door 114 to open.
16. S4 switches, resetting cycle.
17. S6 switches, removing +24V from K5.
18. K5 releases, removing vacuum from copy plate.

The door opener 34 (FIG. 3) is an independent pneumatic function that is not externally connected to the rest of the system. Door opener 34 comprises an air cylinder that is primed by the closing of the door 14, and activated by the opening of the door 14. Its purpose is to restrict the momentum of the falling door as it opens.

Closing of the door 14 causes the piston in the air cylinder to be drawn forward. At the same time, air is drawn into the cylinder through the rear valve, and expelled through the forward check valve. Thus, when the door 14 starts to fall open at the end of a cycle, the speed at which it falls is checked by two forces. One is the lack of air in the forward end of the cylinder (the more the piston moves toward the rear of the cylinder, the greater the force trying to draw it back to its closed position). The second is the compressing action of the air in the rear of the cylinder (the air trying to escape through an adjustable orifice at the rear of the cylinder).

Figure 9:
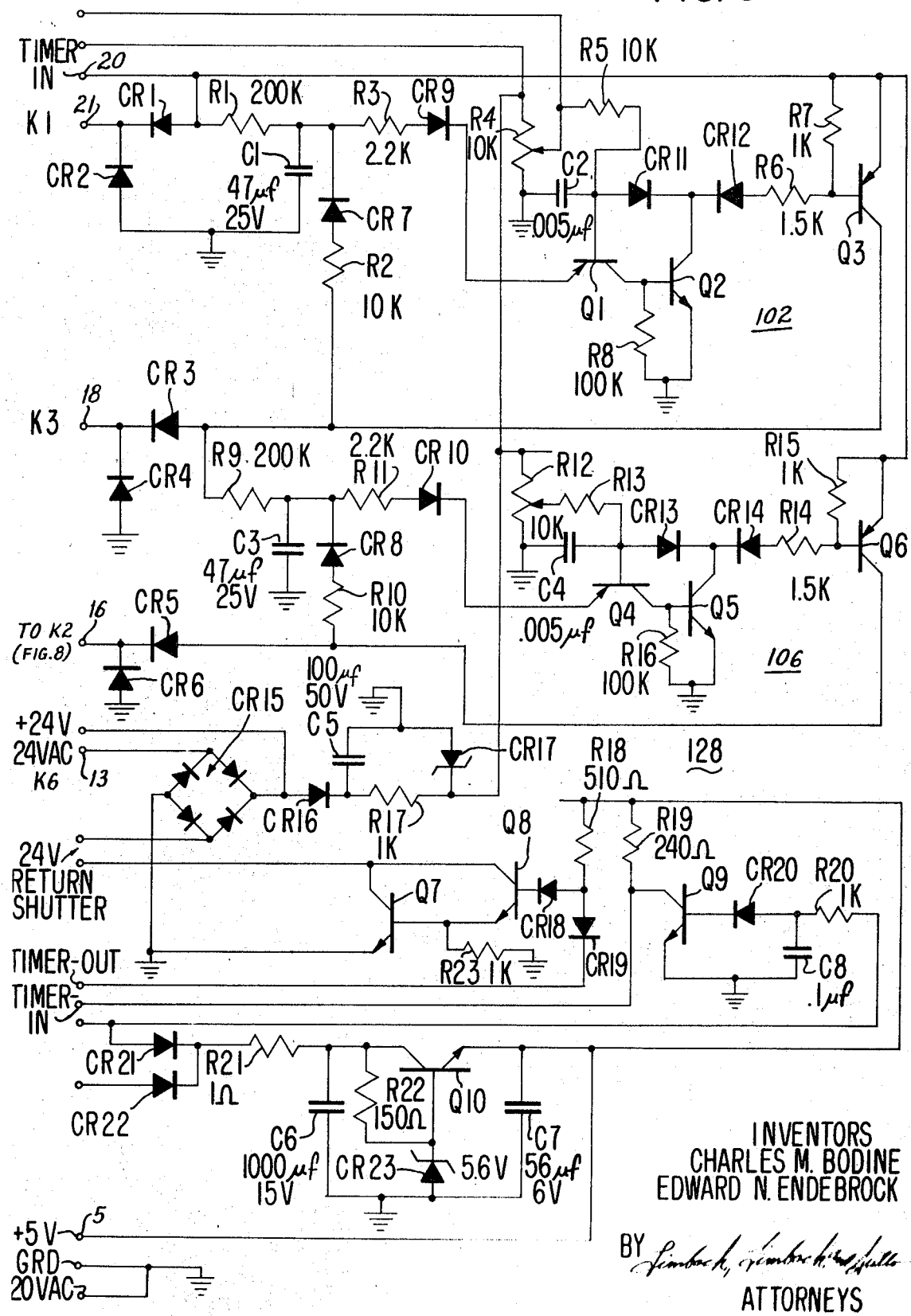
FIG. 9 is a detailed schematic of the delay circuit shown in block form in FIG. 8.

The delay circuit 128 shown in detail in FIG. 9 has four main functions:
a. Sequence the operation of the solenoids through two electrical delay circuits 102 and 106 that are in series.
b. Supply all dc power.
c. Amplify output from pin 17 on timer board 116 (to pin 15 on delay board) so that it can drive shutter solenoid K6.
d. Supply a line synchronous square wave as clock input to the timer board 116 (pin 4 on delay board 128 to pin 20 on timer board 116).

Machine operation is initiated when door switch S4 is closed, supplying 24 volts to pin 20 on the delay board, activating door clamp solenoid K1 through pin 21, and starting the first delay element 102. Capacitor C1 charges toward 24-volts through R1. Transistor Q1, normally off, has an adjustable potential potentiometer R4 control on its base. As the voltage across C1 rises, the Q1 emitter voltage rises until it becomes 0.6 volt higher than the Q1 base voltage, turning Q1 on. Q1 applies a positive voltage to the Q2 base, turning on Q2. Q2 pulls the base voltage of Q1 down to 0.8 volt through CR11, and also turns on Q3. Q3 energizes solenoid K3, starts the second delay element 106, and holds itself on through R2 and CR7. Q3 remains on until shut-down relay K4 (FIG. 8) is opened by the timer 116.

The second delay element 106 controls actuation of solenoid K2. Its circuit operation is identical to that of delay 102.

The 24-volt unregulated power is supplied by the full-wave bridge CR15, and filtered by capacitor C1 (FIG. 8). This voltage is filtered further by diode CR16 and capacitor C5 for use as the supply for 15-volt zener-regulated power. CR21 and CR22 rectify the 20-volt center-tap power for a 5-volt regulated supply. Q10 and CR23, with their associated components, form a series regulator. The 5 volts available at pin 5 drives the digital logic on the timer board 116 (pin 1).

Transistors Q7 and Q8 with their associated components, form a darlington amplifier that allows a logic-level input to drive the 24-volt 1.5-ampere shutter solenoid K6. Q9 and CR20 convert the 1-volt-rms ac signal into a 5-volt square wave for the timer board 116. CR20 protects the base-emitter junction of Q9 during the negative excursion of the ac input. C8 provides high-frequency noise decoupling.

Figure 10:
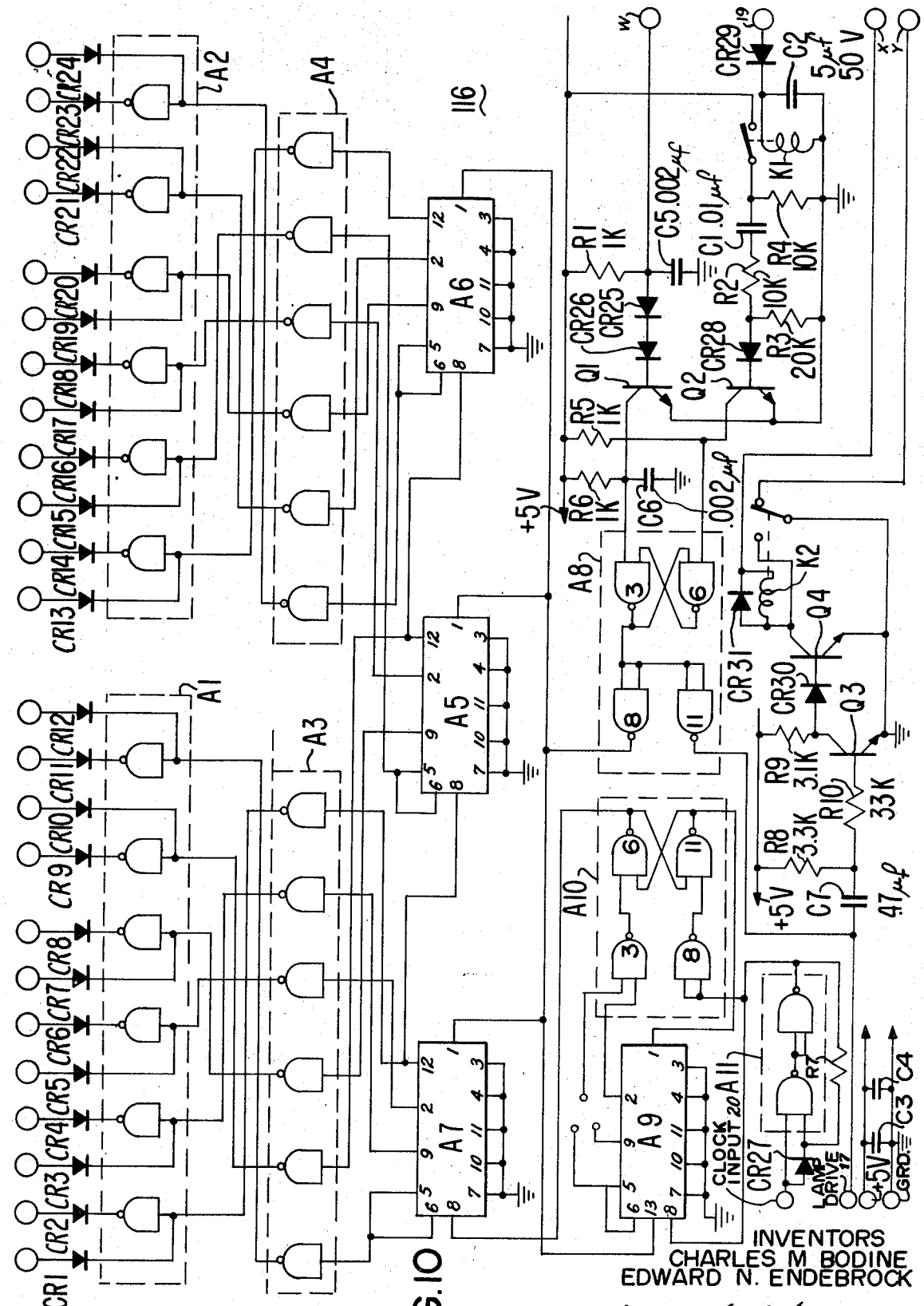
FIG. 10 is a detailed schematic diagram of the timer shown in block form in FIG. 8.

Referring to FIG. 10, the timer board 116 has two functions:
a. Open the shutter solenoid for a digitally programmed time (0.1 to 99.9 seconds).
b. Automatically shut down the photo-apparatus after exposure is complete.

The four decimal counting units (DCU's) A5, A6, A7 and A9 are the chief elements of the timer board. DCU A9 is programmed through the jumper option as either a divide-by-six (60Hz source) or a divide-by-five (50Hz source circuit). The output of this circuit is taken from pin 6 of A10 and is always a 0.1-Hz square wave. DCU's A7, A5, and A6 are divide-by-ten circuits which count tenths of seconds, seconds, and tens of seconds, respectively.

Buffers, A1, A2, A3 and A4 isolate the decoded outputs from DCU's A7, A5 and A6 to prevent ringing at the DCU outputs, and thereby eliminate false counts and timer inaccuracy. These buffers also generate the complementary outputs required for decoding. The decoded outputs are connected to the digital switches as shown in FIG. 8. The switch commons are bussed together and connected to pin W of timer 116.

The shutter 88 and shut-down circuitry are driven by shutter A8 through pin 11. The shutter 88 is on when the voltage at A8, pin 11 is high (5 volts). A11 is used as a schmitt trigger to further shape the clock pulse supplied by the delay board (pin 4 on the delay board to pin 20 of the timer board).

The counting cycle starts when a 24-volt signal supplied by pneumatically actuated switch S3 appears at pin 19 (FIG. 8). This voltage actuates reed switch K1 which pulses Q2 through capacitor C1. Q2 sets latch A8 which allows the timer to operate until it reaches its pre-set time. During a timing operation, the voltage at pin W is low (1.0 voltage maximum). When the pre-set time (count) is reached, the voltage at pin W goes high (3.8-volt minimum) turning on Q1. Q1 resets latch A8 which resets the counters and holds them off through its output at pin 8.

At the end of the timing interval, the signal at A8, pin 11, goes from 5 volts to 0.4 volts, turning off normally on transistor Q3 which turns on normally off transistor Q4. Q4 causes the reed switch K2 to come on and latch itself by shorting out Q4. K2 receives its power from door switch S4 and remains on until the handling chamber door opens. K4 (FIG. 8) is held normally on when K2 is off. When K2 goes on, K4 goes off and its contacts (K4-A) open, shutting down the machine in a pneumatically programmed sequence.

In the particular embodiment described, all diodes are IN457A unless otherwise noted in the drawings.

While one specific embodiment of the invention has been illustrated and described in detail herein, it is obvious that many modifications thereof may be made without departing from the spirit of the invention as described in the appended claims.

We claim:

1. Photo-printing apparatus comprising:
   a. light exposure system;
   b. a housing for enclosing said light exposure system and including means for holding and aligning a master plate to be duplicated;
   c. a copy plate holder door for receiving and holding a copy plate; said door being pivoted to an operational position with said copy plate in aligned contact with said master plate;
   d. means for pivotally mounting said door to said housing;
   e. first means for applying a positive external fluid pressure to said copy plate and second means for applying a positive external fluid pressure to said master plate when said copy and master plates are in aligned contact during an exposure; and
   f. means for controlling the length of light exposure of said master and copy plates to said light exposure means.

2. Photo-printing apparatus as in claim 1 including a piston movably mounted within said copy plate holder door; said piston including means for registering said copy plate and wherein said first means for applying pressure to said copy plate is operable to apply a positive air pressure to the back side of said piston.

3. Photo-printing apparatus as in claim 2 wherein said piston includes first means for providing a negative pressure to the back side of said copy plate to secure the same during an exposure operation.

4. Photo-printing apparatus as in claim 3 including second means for applying a negative pressure to the backside of said master plate after an exposure to facilitate separation of said master and copy plates.

5. Photo-printing apparatus as in claim 4 wherein said first means for providing a negative pressure comprises a negative pressure source coupled to the surface of said piston through a passageway through said piston.

6. Photo-printing apparatus as in claim 5 wherein said piston includes at least two alignment pins, and including a master plate holder cam for receiving a master plate and slidably mounted to said housing and movable into a properly aligned position with respect to said copy plate by the action of said alignment pins in cooperation with said cam when said copy plate holder door is pivoted to the operational position.

7. Photo-printing apparatus as in claim 6 wherein said pivotally mounted means includes a hinge member and flexible means for securing said door to said hinge member.

8. Photo-printing apparatus as in claim 7 wherein said flexible means comprises at least one leaf spring.

9. Photo-printing apparatus as in claim 8 wherein said light exposure system comprises:
   i. a light source;
   ii. optical system for projecting light from said light source to said master and copy plate; and
   iii. a controllable shutter for cutting the projected light beam on and off.

10. Photo-printing apparatus as in claim 9 wherein said optical system includes a green filter.

11. Photo-printing apparatus as in claim 9 wherein said optical system includes a filter for permitting the passage of substantially all of the infra-red wavelengths but substantially none of the ultra violet wavelengths.

12. Photo-printing apparatus as in claim 9 wherein said optical system includes at least a pair of reflecting mirrors located at a 45° angle to the light beam path to redirect the light beam to reduce the length of said housing.

13. Photo-printing apparatus as in claim 9 wherein said optical system includes a condenser lense for collimating the light beam and a diffuser located along the light beam path.

14. Photo-printing apparatus comprising:
   a. light exposure system;
   b. a housing for enclosing said light exposure system including means for holding and aligning a master plate to be duplicated with a copy plate;
   c. fluid pressure means for applying a positive external pressure to said copy plate and for applying a positive external pressure to said master plate when said copy and master plates are in aligned contact during exposure; and
   d. means for controlling the length of light exposure of said master and copy plates to said light exposure means.

15. Photo-printing apparatus as in claim 14 wherein said fluid pressure means includes a piston.

16. Photo-printing apparatus as in claim 14 wherein said piston includes means for providing a negative pressure to the back side of said plate adjacent thereto to secure the same during an exposure operation.

17. Photo-printing apparatus as in claim 1 wherein said piston includes means for registering said copy plate.

* * * * *